US009528029B2

(12) United States Patent
Sobczak

(10) Patent No.: US 9,528,029 B2
(45) Date of Patent: Dec. 27, 2016

(54) AQUEOUS COATING COMPOSITION, METHOD FOR PROVIDING A COATING AND CEMENTITIOUS SUBSTRATE COATED THEREWITH

(75) Inventor: Jeffrey J. Sobczak, Coatsville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 965 days.

(21) Appl. No.: 13/333,287

(22) Filed: Dec. 21, 2011

(65) Prior Publication Data

US 2012/0164467 A1 Jun. 28, 2012

Related U.S. Application Data

(60) Provisional application No. 61/427,521, filed on Dec. 28, 2010.

(51) Int. Cl.
| | |
|---|---|
| *C09D 7/12* | (2006.01) |
| *B32B 27/06* | (2006.01) |
| *B05D 3/02* | (2006.01) |
| *C09D 201/02* | (2006.01) |
| *C08K 5/04* | (2006.01) |
| *C08K 5/06* | (2006.01) |
| *C08K 5/11* | (2006.01) |

(52) U.S. Cl.
CPC .............. *C09D 201/02* (2013.01); *C08K 5/04* (2013.01); *C08K 5/06* (2013.01); *C08K 5/11* (2013.01); *C08L 2201/00* (2013.01); *Y10T 428/31938* (2015.04)

(58) Field of Classification Search
CPC ................... C09D 7/12; B32B 27/06
USPC ....... 524/261, 314, 378; 428/523; 427/393.6, 427/385.5
See application file for complete search history.

(56) References Cited

U.S. PATENT DOCUMENTS

| | | | |
|---|---|---|---|
| 4,325,856 A | 4/1982 | Ishikawa et al. | |
| 4,384,056 A | 5/1983 | Schmidt et al. | |
| 4,539,361 A | 9/1985 | Siol et al. | |
| 4,654,397 A | 3/1987 | Mueller-Mall et al. | |
| 4,814,373 A | 3/1989 | Frankel et al. | |
| 5,162,415 A | 11/1992 | Rehmer et al. | |
| 5,753,782 A | 5/1998 | Hammond et al. | |
| 6,258,887 B1 | 7/2001 | Bardman et al. | |
| 6,762,230 B2 | 7/2004 | Brandenburger et al. | |
| 7,537,802 B2 | 5/2009 | Rosano | |
| 7,705,081 B2 | 4/2010 | Porzio et al. | |
| 2007/0191522 A1* | 8/2007 | Obst et al. | 524/261 |
| 2008/0119600 A1 | 5/2008 | Anchor et al. | |
| 2009/0149591 A1 | 6/2009 | Yang et al. | |
| 2009/0198002 A1 | 8/2009 | Zhou et al. | |
| 2009/0318596 A1* | 12/2009 | Fu et al. | 524/232 |
| 2010/0068397 A1 | 3/2010 | Taylor et al. | |

FOREIGN PATENT DOCUMENTS

| | | |
|---|---|---|
| EP | 0501614 A2 | 9/1992 |
| EP | 0697423 A2 | 2/1996 |
| EP | 2133375 A1 | 12/2009 |
| WO | 9731982 A1 | 9/1997 |
| WO | 2004090005 A1 | 10/2004 |

OTHER PUBLICATIONS

"COASOL™ Di-Ester for Applications in Water-borne Coatings, Industrial Cleaners & Polymer Industry," The Dow Chemical Company, Jul. 2008.
"THIOKOL™ TP-90B Plasticizer," Rohm and Haas Company, Transportation Adhesives, 2006.

* cited by examiner

*Primary Examiner* — Jim J Seidleck
*Assistant Examiner* — Deve E Valdez
(74) *Attorney, Agent, or Firm* — Andrew E. C. Merriam

(57) ABSTRACT

An aqueous coating composition including: a first emulsion polymer including, as copolymerized units, 5% to 50% styrene monomer, by weight based on the weight of the first emulsion polymer, wherein the glass transition temperature (Tg) of the first emulsion polymer is from 55° C. to 110° C.; a certain optional second emulsion polymer; and from 20% to 35%, by weight based on the total weight of the first emulsion polymer and the optional second emulsion polymer, coalescent selected from the group consisting of hexaoxatricosane, $C_4$ alkyl glutarates, $C_4$ alkyl succinates, $C_4$ alkyl adipates, and mixtures thereof is provided. A method for providing a coating using the aqueous coating composition, particularly a coating for cementious substrates, the coating desirably providing superior hot tire pickup resistance is also provided.

7 Claims, No Drawings

AQUEOUS COATING COMPOSITION, METHOD FOR PROVIDING A COATING AND CEMENTITIOUS SUBSTRATE COATED THEREWITH

This invention relates to an aqueous coating composition. More particularly, the invention relates to an aqueous coating composition including a first emulsion polymer including, as copolymerized units, 5% to 50% styrene monomer, by weight based on the weight of the first emulsion polymer, wherein the glass transition temperature ("Tg") of the first emulsion polymer is from 55° C. to 110° C.; and from 20% to 35%, by weight based on the weight of the first emulsion polymer, coalescent selected from the group consisting of hexaoxatricosane, $C_4$-alkyl glutarates, $C_4$-alkyl succinates, $C_4$-alkyl adipates, and mixtures thereof. The invention also relates to a method for forming a coating from the aqueous coating composition and a substrate bearing with the coating.

The present invention serves to provide an aqueous coating composition suitable for use in decorative and/or protective coatings for various substrates, particularly for clear (i.e., unpigmented) sealers for cementitious substrates such as for example, concrete driveway sealers, and pigmented coatings for cementious substrates, such as, for example, patio paints and garage floor paints, which coatings maintain a desirable balance of coatings properties, particularly including good film formation and hot tire pickup resistance, especially in low volatile organic content ("VOC") aqueous coatings such as, for example, aqueous coatings having a VOC<100 g/l. It has long been known that a high level of resistance properties can be achieved with a hard (i.e., relatively high Tg relative to use temperature) polymer but not without jeopardizing film formation or requiring environmentally undesirable high levels of volatile coalescing solvents (i.e., high VOC).

U.S. Pat. No. 6,258,887 discloses a multi-stage aqueous emulsion-polymer suitable for use in dirt pickup resistant coatings and coatings containing the polymer. The multi-stage aqueous emulsion polymer includes (i) a first polymer including at least one nonionic copolymerized monoethylenically unsaturated monomer, from 0.5% to 7% of a copolymerized monoethylenically unsaturated ionic monomer, based on the weight of the first polymer, and from 0% to 1.0%, based on the weight of the first polymer, of a copolymerized multi-ethylenically unsaturated monomer, the first polymer having a Tg of 15° C. to 105° C.; and (ii) a second polymer comprising at least one nonionic copolymerized monoethylenically unsaturated monomer, from 0% to 2% of a copolymerized monoethylenically unsaturated ionic monomer, and from 0.25% to 6%, based on the weight of the second polymer, copolymerized multi-ethylenically unsaturated monomer, the second polymer having a Tg of −55° C. to 30° C., the second polymer having a different composition than the first copolymer, and the second polymer being from 25% to 75% of the total weight of the first polymer and the second polymer, based on dry polymer weights. However, improvements in the balance of coatings properties obtainable from coatings particularly those employing low VOC are still desired.

The problem faced by the inventors is the provision of an aqueous coating composition including an emulsion polymer to provide dried coatings that maintain a desirable balance of coatings properties, particularly including good film formation, adhesion, and effective hardness as exemplified by black tire marking resistance, especially in low VOC coatings.

In a first aspect of the present invention there is provided an aqueous coating composition comprising: a first emulsion polymer comprising, as copolymerized units, 5% to 50% styrene monomer, by weight based on the weight of said first emulsion polymer, wherein the glass transition temperature (Tg) of said first emulsion polymer is from 55° C. to 110° C.; and from 20% to 35%, by weight based on the weight of said first emulsion polymer, coalescent selected from the group consisting of hexaoxatricosane, $C_4$ alkyl glutarates, $C_4$ alkyl succinates, $C_4$ alkyl adipates, and mixtures thereof.

In a second aspect of the present invention there is provided a method for providing a coating comprising: (a) forming the aqueous coating composition of the first aspect of the present invention; (b) applying said aqueous coating composition to a substrate; and (c) drying said applied aqueous coating composition.

In a third aspect of the present invention there is provided a cementitious substrate bearing a coating formed by the method of the second aspect of the present invention.

The aqueous coating composition of the present invention includes a first emulsion polymer including, as copolymerized units, 5% to 50%, preferably from 10% to 40%, styrene monomer, by weight based on the weight of the first emulsion polymer.

The first emulsion polymer includes at least one nonionic copolymerized ethylenically unsaturated monomer other than styrene such as, for example, a (meth)acrylic ester monomer including methyl(meth)acrylate, ethyl (meth)acrylate, butyl(meth)acrylate, 2-ethylhexyl(meth)acrylate, decyl (meth)acrylate, hydroxyethyl(meth)acrylate, hydroxypropyl (meth)acrylate, ureido-functional (meth)acrylates and acetoacetates, acetamides or cyanoacetates of (meth)acrylic acid; substituted styrenes; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, and N-vinyl pyrollidone; (meth)acrylonitrile; N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively.

In certain embodiments the first emulsion polymer includes from 0% to 5%, or in the alternative, from 0% to 1.5%, by weight based on the weight of the first polymer, of a copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The first emulsion polymer typically includes from 0.5% to 10%, preferably from 1% to 8%, of a copolymerized monoethylenically-unsaturated acid-group containing monomer, by weight based on the weight of the first polymer. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Preferred acid monomers for copolymerization into the first emulsion polymer are carboxylic acid monomers.

The Tg of the first emulsion polymer is from 55° C. to 110° C., preferably from 85° C. to 110° C., as determined by differential scanning calorimetry ("DSC") using a ramp rate of 20° C./min. In the event that more than one first emulsion polymer is used or that a multistage first emulsion polymer is used the Tg of the first emulsion polymer herein shall be the weighted average of the separate DSC Tgs accruing to the polymeric phases, stages or components. By "weighted average" herein is meant the numerical average of the Tgs, the contribution of each being proportional to the dry polymer content by weight. For example, for a composition including 40 weight % of polymer I having a DSC Tg of Tg(I) and 60 weight % of polymer II having a DSC Tg of Tg(II), the weighted average Tg=0.4 [Tg(I)]+0.6 [Tg(II)].

In certain embodiments the aqueous coating composition includes from 0.1% to 100%, preferably from 10% to 50%, more preferably from 10% to 30%, by weight based on the weight of the first emulsion polymer, second emulsion polymer, wherein the Tg of the second emulsion polymer is from 10° C. to 70° C., wherein the Tg of the second emulsion polymer is lower than the Tg of the first emulsion polymer, and wherein the weighted average Tg of the first emulsion polymer and the second emulsion polymer is from 55° C. to 95° C. In the event that more than one second emulsion polymer is used or that a multistage second emulsion polymer is used the Tg of the second emulsion polymer herein shall be the weighted average of the separate DSC Tgs.

The second emulsion polymer includes, as copolymerized units, at least one nonionic ethylenically-unsaturated monomer typically selected from styrene and those disclosed above for the first emulsion polymer. The second emulsion polymer includes from 0% to 5%, or in the alternative, from 0% to 1.5% by weight based on the weight of the first polymer, of a copolymerized multi-ethylenically unsaturated monomer. Multi-ethylenically unsaturated monomers include, for example, those disclosed herein for the first emulsion polymer. The second emulsion polymer typically includes from 0.5% to 10%, preferably from 1% to 8%, of a copolymerized monoethylenically-unsaturated acid-group containing monomer, by weight based on the weight of the first polymer. Monoethylenically-unsaturated acid-group containing monomers include, for example, those disclosed herein for the first emulsion polymer.

The polymerization techniques used to prepare the first and the optional second emulsion polymer are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of one or more of the polymers. The monomer mixture may be added neat or as an emulsion in water. The monomer mixture may be added in a single addition or more additions or continuously over the reaction period using a uniform or varying composition; preferred is the addition of the first and/or second polymer monomer emulsion as a gradual addition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

The weight average particle diameter of the first and the optional second emulsion polymerized polymer particles, independently, is typically from 30 nm to 500 nm.

The aqueous coating composition includes from 20% to 35%, preferably from 25% to 30%, by weight based on the total weight of the first emulsion polymer and, if included, the second emulsion polymer, coalescent selected from the group consisting of hexaoxatricosane, $C_4$ alkyl glutarates, $C_4$ alkyl succinates, $C_4$ alkyl adipates, and mixtures thereof. By 'coalescent' herein is meant an organic compound capable of lowering the minimum film formation temperature of an emulsion polymer. By "$C_4$ alkyl" herein is meant any of the butyl group isomers such as, for example, n-butyl, s-butyl, i-butyl, t-butyl, and mixtures thereof.

The aqueous coating composition is prepared by techniques which are well known in the coatings art. First, pigment(s), if desired, are well dispersed in an aqueous medium under high shear such as is afforded by a COWLES™ mixer or predispersed colorant(s), or mixtures thereof are used. Then the emulsion polymer(s) is added under low shear stirring along with other coatings adjuvants as desired. The aqueous coating composition may contain, in addition to the first emulsion polymer, optional second emulsion polymer, and optional pigment(s), conventional coatings adjuvants such as, for example, emulsifiers; coalescents other than hexaoxatricosane, C4 alkyl glutarates, C4 alkyl succinates, C4 alkyl adipates, and mixtures thereof plasticizers; antifreezes; curing agents; buffers; neutralizers; thickeners; rheology modifiers; humectants; wetting agents; biocides; antifoaming agents; UV absorbers; fluorescent brighteners; light or heat stabilizers; biocides; chelating agents; dispersants; colorants; waxes; water-repellents; and anti-oxidants. In certain embodiments a photosensitive compound such as, for example, benzophenone or a substituted acetophenone or benzophenone derivative as is taught in U.S. Pat. No. 5,162,415 may be added.

In particular, it is desirable to include silanes in the aqueous coating compositions of this invention, particularly intended for application to cementitious substrates. Typically from 0.01% to 5%, preferably from 0.05% to 1.0%, by weight based on the total weight of the first emulsion polymer and, if included, the second emulsion polymer, is used. The silane used may be, for example, an epoxysilane such as, for example, Dow Corning Z-6040 or an aminosilane.

Further, it is desirable to include divalent zinc ion species in certain aqueous coating compositions. Typically from 0.05 to 1.0, preferably from 0.10 to 0.75, equivalents of Zn++ per mole of carboxylic acid groups is used. The zinc ion species may be provided, for example, by using Zinplex™15 (product of Munzing Corp.).

In certain embodiments the aqueous coating composition of the invention has a VOC (volatile organic compound) level of 100, or lower, g/liter of coating, alternatively of 50 g/liter or lower.

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

The aqueous coating composition is typically applied to a substrate such as, for example, wood, metal, plastics, cementitious substrates such as, for example, cement, concrete, stucco, and mortar, previously painted or primed surfaces, and aged or weathered surfaces. Preferred is application to a cementitious substrate. The aqueous coating composition may be applied to a substrate using conventional coatings application methods such as, for example, curtain coater, brush, roller, squeegee, mop, and spraying methods such as, for example, air-atomized spray, air-assisted spray, airless spray, high volume low pressure spray, and air-assisted airless spray.

Drying of the aqueous coating composition may be allowed to proceed under ambient conditions such as, for example, at 5° C. to 35° C. or the coating may be dried at elevated temperatures such as, for example, from 35° C. to 150° C.

The following examples serve to illustrate the invention. Method for determining Hot Tire Pickup Resistance ("HTPUR").

Clear concrete sealer (aqueous coating composition) hot tire pickup resistance was evaluated by applying each sealer to the surface of any of several substrates, including 4"×6"×1" concrete blocks with normal surface porosity, 4"×6"×½" concrete slabs with a smooth, relatively non-porous surface, 4"×6" aluminum Q-panels, or 4"×6"×½" exterior grade plywood sections. The sealers were applied at a level of 2.0 g per test tile, corresponding to a surface coverage level of approximately 325 ft² per gallon. After application of the sealer, the test tiles were allowed to dry for three days at ambient conditions (typically 25° C./50% RH) before commencement of HTPU testing.

After the sealed HTPU test panels were dried for three days, testing was carried out by completing a series of concurrent and sequential steps. First the coated test tiles were each placed face down for one hour on wet cheesecloth. In conjunction with this step, ten 4"×2.5" automobile tire tread sections, cut from the same tire, were submerged in a bucket of water and placed in a 60° C. oven for one hour. Two types of tires were used, with one being an older high mileage tire, and the other a newer, less worn tire. After one hour, tire sections removed from the water one at a time, were placed across the coated face of the test tile at the 4" test tile edge, such that the 4" tire edge was parallel to the 4" test tile edge, with the tire edge and test panel edge being flush with each other. The tire sections were clamped to the test tile using a torque wrench and two 4"×5" adjustable C-clamps placed equidistant from the edge, approximately midway between the center and the edge of the tire along the 4" dimension. Three 3"×6" steel plates were also placed in between the clamp and the back of the rubber tire for support and equal distribution of pressure.

The torque wrench used was set to 19 inch-pounds, which equates to a measured force per c-clamp of about 100 pounds, or total pressure of about 25 psi. After the two clamps were placed on each sample, the entire test sample apparatus was returned to the 60° C. oven, removed after 90 minutes at 60° C., and then allowed to cool for two hours before rating for HTPUR. Ratings were conducted by removing the clamps, separating the tire from the coated surface, and assessing the damage done to the coating, primarily in terms of black tire marking and adhesion loss using a 1 to 10 scale, with 10 representing no black tire marking or adhesion loss. A subjective measure of degree of sticking between the tire and the coating upon removal was also recorded.

EXAMPLE 1

Formation of Aqueous Coating Composition, Formation of Coating Therefrom and Evaluation of Coating Tests were conducted using the aqueous coating composition (clear concrete sealer) shown in Table 1.1

TABLE 1.1

Aqueous coating composition
Clear Concrete Sealer Formulation #1

| Mix | Parts by Weight (pbw) |
| --- | --- |
| Emulsion polymer | 547.59 |
| Water | 100.00 |
| Ammonia (28%) | 0.55 |
| Dowanol ™ PPh | 19.40 |
| Dowanol ™ PnB | 6.47 |
| Surfynol ™ 104E | 0.75 |
| Coalescent | 53.89 |
| DeeFo ™ PI-35 | 0.22 |
| Drewplus ™ L-108 | 0.11 |
| Water | 132.39 |
| Acrysol ™ RM-825 | 0.86 |
| Polymer Solids = 25% | |
| VOC = 98 g/L | |

Dowanol ™ PPh, Dowanol ™ PnB, and Acrysol ™ RM-825 are products of The Dow Chemical Company.
SurfynolTM 104E is a product of Air Products and Chemicals, Inc.
DeeFo ™ PI-35 is a product of Munzing Corp.
Drewplus ™ L-108 is a product of Ashland, Inc.

In Example 1, the "Emulsion Polymer" used was a blend (80/20 solids/solids) of first emulsion polymer A (a single stage emulsion polymer including, as copolymerized units, 20% styrene monomer, by weight based on the weight of the first emulsion polymer; the Tg being 103° C.) and second emulsion polymer a (a two-stage emulsion polymer having a weighted Tg of 33° C.), and included 0.5%, by weight based on total polymer weight, Dow Corning Z-6040 epoxysilane. Clear concrete sealers with various chemical species as the "coalescent" in the above formulation, a series of hot tire pickup resistance (HTPUR) tests were conducted.

TABLE 1.2

Evaluation of coatings
HTPUR Test Results
Substrate: Concrete Block (normal surface porosity)
Tire: Older/higher mileage

| Coalescent | (bp < 250° C.) VOC | Black Tire Marking | Adhesion | Sticking |
| --- | --- | --- | --- | --- |
| Propylene glycol phenyl ether | Yes | 7 | 10 | Heavy |
| 2,2,4-trimethyl-1,3-pentanediol monoisobutyrate | Yes | 9 | 10 | Moderate |
| Hexaoxatricosane | No | 10 | 10 | Slight |
| Dibutyl phthalate | No | 6 | 10 | Moderate |
| Triethylene glycol diethyl hexanoate | No | 7 | 10 | Heavy |
| Diethylene/dipropylene glycol dibenzoate | No | 7 | 10 | Moderate |
| Tributoxyethyl phosphate | Yes | 10 | 10 | Moderate |

TABLE 1.2-continued

Evaluation of coatings
HTPUR Test Results
Substrate: Concrete Block (normal surface porosity)
Tire: Older/higher mileage

| Coalescent | (bp < 250° C.) VOC | Black Tire Marking | Adhesion | Sticking |
|---|---|---|---|---|
| Benzoate ester (Velate ™ 375) | No | 9 | 10 | Heavy |
| Methyl phenyl ethoxylate | No | 5 | 10 | Heavy |
| Diisobutyl glutarate/succinate/adipate | No | 9 | 10 | Moderate |

TABLE 1.3

Evaluation of coatings
HTPUR Test Results
Substrate: Concrete Block (normal surface porosity)
Tire: Newer/Low Mileage

| Coalescent | (bp < 250° C.) VOC | Black Tire Marking | Adhesion | Sticking |
|---|---|---|---|---|
| Propylene glycol phenyl ether | Yes | 5 | 10 | Heavy |
| 2,2,4-trimethyl-1,3-pentanediol monoisobutyrate | Yes | 10 | 10 | Moderate |
| Hexaoxatricosane | No | 10 | 10 | Slight |
| Dibutyl phthalate | No | 8 | 10 | Moderate |
| Triethylene glycol diethyl hexanoate | No | 6 | 10 | Heavy |
| Diethylene/dipropylene glycol dibenzoate | No | 7 | 10 | Moderate |
| Tributoxyethyl phosphate | Yes | 6 | 10 | Moderate |
| Benzoate ester (Velate ™ 375) | No | 7 | 10 | Heavy |
| Methyl phenyl ethoxylate | No | 5 | 10 | Heavy |
| Diisobutyl glutarate/succinate/adipate | No | 9 | 10 | Moderate |

TABLE 1.4

Evaluation of coatings
HTPUR Test Results #1C
Substrate: Concrete Block (smooth low porosity surface)
Tire: Newer/Low Mileage

| Coalescent | (bp < 250° C.) VOC | Black Tire Marking | Adhesion | Sticking |
|---|---|---|---|---|
| Propylene glycol phenyl ether | Yes | 4 | 10 | Heavy |
| 2,2,4-trimethyl-1,3-pentanediol monoisobutyrate | Yes | 6 | 10 | Moderate |
| Hexaoxatricosane | No | 9 | 10 | Slight |
| Dibutyl phthalate | No | 5 | 10 | Moderate |
| Triethylene glycol diethyl hexanoate | No | 5 | 10 | Heavy |
| Diethylene/dipropylene glycol dibenzoate | No | 7 | 10 | Moderate |
| Tributoxyethyl phosphate | Yes | 5 | 6 | Heavy |
| Benzoate ester (Velate ™ 375) | No | 4 | 10 | Heavy |
| Methyl phenyl ethoxylate | No | 3 | 10 | Heavy |
| Diisobutyl glutarate/succinate/adipate | No | 7 | 10 | Moderate |

TABLE 1.5

Evaluation of coatings
HTPUR Test Results
Substrate: Aluminum Q-Panel
Tire: Newer/Low Mileage

| Coalescent | (bp < 250° C.) VOC | Black Tire Marking | Adhesion | Sticking |
|---|---|---|---|---|
| Propylene glycol phenyl ether | Yes | 7 | 10 | Moderate |
| 2,2,4-trimethyl-1,3-pentanediol monoisobutyrate | Yes | 4 | 10 | Heavy |
| Hexaoxatricosane | No | 10 | 10 | Slight |
| Dibutyl phthalate | No | 7 | 10 | Moderate |
| Triethylene glycol diethyl hexanoate | No | 8 | 10 | Heavy |
| Diethylene/dipropylene glycol dibenzoate | No | 9 | 10 | Moderate |
| Tributoxyethyl phosphate | Yes | 9 | 10 | Moderate |
| Benzoate ester (Velate ™ 375) | No | 8 | 10 | Heavy |
| Methyl phenyl ethoxylate | No | 9 | 10 | Moderate |
| Diisobutyl glutarate/succinate/adipate | No | 9 | 10 | Slight |

TABLE 1.6

Evaluation of coatings
HTPUR Test Results
Substrate: Exterior Grade Plywood
Tire: Newer/Low Mileage

| Coalescent | (bp < 250° C.) VOC | Black Tire Marking | Adhesion | Sticking |
|---|---|---|---|---|
| Propylene glycol phenyl ether | Yes | 8 | 10 | Moderate |
| 2,2,4-trimethyl-1,3-pentanediol monoisobutyrate | Yes | 5 | 10 | Heavy |
| Hexaoxatricosane | No | 8 | 10 | Moderate |
| Dibutyl phthalate | No | 7 | 10 | Moderate |
| Triethylene glycol diethyl hexanoate | No | 5 | 10 | Heavy |
| Diethylene/dipropylene glycol dibenzoate | No | 9 | 10 | Moderate |
| Tributoxyethyl phosphate | Yes | 7 | 10 | Moderate |
| Benzoate ester (Velate ™ 375) | No | 6 | 10 | Moderate |
| Methyl phenyl ethoxylate | No | 4 | 10 | Heavy |
| Diisobutyl glutarate/succinate/adipate | No | 9 | 10 | Moderate |

TABLE 1.7

Summary of evaluation of coatings
HTPUR Test Results Summary
Substrate: Various

| Coalescent | (bp < 250° C.) VOC | Average Black Tire Marking Rating |
|---|---|---|
| Propylene glycol phenyl ether | Yes | 6.2 |
| 2,2,4-trimethyl-1,3-pentanediol monoisobutyrate | Yes | 6.8 |
| Hexaoxatricosane | No | 9.4 |
| Dibutyl phthalate | No | 6.6 |

TABLE 1.7-continued

Summary of evaluation of coatings
HTPUR Test Results Summary
Substrate: Various

| Coalescent | (bp < 250° C.) VOC | Average Black Tire Marking Rating |
|---|---|---|
| Triethylene glycol diethyl hexanoate | No | 6.2 |
| Diethylene/dipropylene glycol dibenzoate | No | 7.8 |
| Tributoxyethyl phosphate | Yes | 7.4 |
| Benzoate ester (Velate ™ 375) | No | 6.8 |
| Methyl phenyl ethoxylate | No | 5.2 |
| Diisobutyl glutarate/succinate/adipate | No | 8.6 |

Aqueous coating compositions of the invention including 25% by weight, based on the total weight of the first and second emulsion polymers, hexaoxatricosane or a mixture of diisobutyl glutarate/succinate/adipate provide coatings having superior HTPUR results in low VOC aqueous coating compositions.

EXAMPLE 2

Formation of Aqueous Coating Composition, Formation of Coating Therefrom and Evaluation of Coating Tests were conducted using the aqueous coating composition (clear concrete sealer) shown in Table 2.1

TABLE 2.1

Aqueous coating composition

| Mix | Parts by Weight (pbw) |
|---|---|
| First Emulsion Polymer B | 75.00 |
| Zinplex ™ 15 (premix) | 3.47 |
| Water (premix) | 3.47 |
| Tergitol ™ 15-S-40 (70%) (premix) | 0.11 |
| Butyl Carbitol ™ | 1.26 |
| Dowanol ™ DPnP | 5.04 |
| Coalescent | 4.72 |
| Surfynol ™ 104E | 0.12 |
| Drewplus ™ L-108 | 0.06 |
| Water | 26.28 |
| Polymer Solids = 25% | |
| VOC = 175 g/L | |

Tergitol ™ 15-S-40 and Butyl Carbitol ™ are products of The Dow Chemical Company.

In Example 2, the aqueous coating composition included first emulsion polymer B (a single stage emulsion polymer including, as copolymerized units, 32.6% styrene monomer, by weight based on the weight of the first emulsion polymer; the Tg being 58° C.) and included divalent Zn ion species (Zinplex™ 15). Clear concrete sealers with various chemical species as the "coalescent" in the above formulation, a series of hot tire pickup resistance (HTPUR) tests were conducted as in Example 1.

TABLE 2.2

Evaluation of coatings
HTPUR Test Results
Substrate: Concrete Block (normal surface porosity)
Tire: Older/higher mileage

| Plasticizer | Black Tire Marking | Adhesion |
|---|---|---|
| 2,2,4-trimethyl-1,3-pentanedial monoisobutyrate | 7 | 9 |
| Hexaoxatricosane | 10 | 10 |
| Dibutyl phthalate | 7 | 9 |
| Triethylene glycol diethyl hexanoate | 6 | 9 |
| Tributoxyethyl phosphate | 6 | 8 |
| Methyl phenyl ethoxylate | 7 | 8 |
| Benzoate ester (Velate ™ 262) | 6 | 7 |

An aqueous coating composition of the invention including 25% by weight, based on the weight of the first emulsion polymer, hexaoxatricosane provided a coating having superior HTPUR results.

EXAMPLE 3

Formation of Aqueous Coating Composition, Formation of Coating Therefrom and Evaluation of Coating Tests were conducted using the aqueous coating composition (clear concrete sealer) shown in Table 3.1

TABLE 3.1

Aqueous coating composition

| Mix | Parts by Weight (pbw) |
|---|---|
| First Emulsion Polymer C | 75.00 |
| Zinplex ™ 15 (premix) | 2.34 |
| Water (premix) | 2.34 |
| Tergitol ™ 15-S-40 (70%) (premix) | 0.05 |
| Dowanol ™ PPh | 2.80 |
| Surfynol ™ 104E | 0.11 |
| Coalescent | 5.60 |
| Byk ™ 024 | 0.06 |
| Drewplus ™ L-108 | 0.03 |
| Ammonia (28%) | 0.10 |
| Acrysol ™ RM-825 | 0.06 |
| Polymer Solids = 25% | |
| VOC = 92 g/L | |

In Example 3, the aqueous coating composition included first emulsion polymer C (a single stage emulsion polymer including, as copolymerized units, 40% styrene monomer, by weight based on the weight of the first emulsion polymer; the Tg being 65° C.) and included divalent Zn ion species (Zinplex™ 15). Clear concrete sealers with various chemical species as the "coalescent" in the above formulation, a series of hot tire pickup resistance (HTPUR) tests were conducted as in Example 1.

TABLE 3.2

Evaluation of coatings
HTPUR Test Result #3
Substrate: Concrete Block (normal surface porosity)
Tire: Older/higher mileage

| Plasticizer | Black Tire Marking | Adhesion |
|---|---|---|
| Hexaoxatricosane | 9 | 10 |
| 2,2,4-trimethyl-1,3-pentanediol monoisobutyrate | 5 | 10 |
| Dibutyl phthalate | 6 | 9 |
| Triethylene glycol diethyl hexanoate | 6 | 8 |
| Diisobutyl glutarate/succinate/adipate | 8 | 10 |
| Dibutoxyethoxyethyl adipate | 2 | 10 |
| Dibutoxyethoxyethoxyethyl glutarate | 4 | 10 |

Aqueous coating compositions of the invention including 25% by weight, based on the weight of the first emulsion polymer, hexaoxatricosane or a mixture of diisobutyl glutarate/succinate/adipate provided coatings having superior HTPUR results in low VOC aqueous coating compositions.

What is claimed is:

1. An aqueous coating composition comprising:
    a first emulsion polymer comprising, as copolymerized units, 5% to 50% styrene monomer, by weight based on the weight of said first emulsion polymer, wherein the glass transition temperature (Tg) of said first emulsion polymer is from 55° C. to 110° C.; and
    from 20% to 35%, by weight based on the weight of said first emulsion polymer, coalescent selected from the group consisting of hexaoxatricosane, $C_4$ alkyl glutarates, $C_4$ alkyl succinates, $C_4$ alkyl adipates, and mixtures thereof.

2. The aqueous coating composition of claim 1 further comprising from 0.1% to 100%, by weight based on the weight of said first emulsion polymer, second emulsion polymer, wherein the Tg of said second emulsion polymer is from 10° C. to 70° C., wherein the Tg of said second emulsion polymer is lower than the Tg of said first emulsion polymer, and wherein the weighted average Tg of said first emulsion polymer and said second emulsion polymer is from 55° C. to 95° C.; and 9 from 20% to 35%, by weight based on the total weight of said first emulsion polymer and said second emulsion polymer, coalescent selected from the group consisting of hexaoxatricosane, alkyl glutarates, C4 alkyl succinates, C4 alkyl adipates, and mixtures thereof.

3. The aqueous coating composition of claim 1 further comprising from 0.01% to 5.0%, by weight based on the total weight of said first emulsion polymer, silane.

4. The aqueous coating composition of claim 1 wherein said aqueous coating composition has a VOC level of less than 100 g/liter.

5. The aqueous coating composition of claim 4 wherein said composition has a VOC level of less than 50 g/liter.

6. A method for providing a coating comprising:
    (a) forming the aqueous coating composition of claim 1;
    (b) applying said aqueous coating composition to a substrate; and
    (c) drying said applied aqueous coating composition.

7. The method of claim 6 wherein said substrate is a cementitious substrate.

* * * * *